United States Patent
Garrett et al.

(10) Patent No.: US 11,588,613 B1
(45) Date of Patent: Feb. 21, 2023

(54) SYSTEMS AND METHODS FOR SYNCHRONIZATION OF PHOTONS OVER QUANTUM CHANNELS WITH CO-PROPAGATING CLOCK PULSES

(71) Applicant: Eagle Technology, LLC, Melbourne, FL (US)

(72) Inventors: Michael C. Garrett, Melbourne, FL (US); James A. Nagel, Fort Wayne, IN (US); Victor G. Bucklew, Richmond, VA (US); Samuel H. Knarr, Melbourne, FL (US); Cypryan T. Klish, Melbourne, FL (US); Timothy C. Burt, Webster, NY (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

(21) Appl. No.: 17/511,200

(22) Filed: Oct. 26, 2021

(51) Int. Cl.
*H04L 7/00* (2006.01)
*H04B 10/70* (2013.01)

(52) U.S. Cl.
CPC ............ *H04L 7/0075* (2013.01); *H04B 10/70* (2013.01)

(58) Field of Classification Search
CPC ............................. H04L 7/0075; H04B 10/70
USPC ......................................................... 398/154
See application file for complete search history.

(56) References Cited

U.S. PATENT DOCUMENTS

| | | | |
|---|---|---|---|
| 8,456,736 B2* | 6/2013 | Wise | .................. H01S 3/0057 359/341.1 |
| 9,270,385 B2 | 2/2016 | Meyers et al. | |
| 9,331,843 B2 | 5/2016 | Silverman et al. | |
| 9,800,399 B2* | 10/2017 | Tanzilli | .................. H04L 9/0852 |
| 9,860,054 B1 | 1/2018 | Bradley | |
| 9,952,482 B2 | 4/2018 | Rudolph et al. | |
| 10,003,453 B1 | 6/2018 | Bradley | |
| 10,379,420 B1 | 8/2019 | Wang | |
| 10,862,678 B2 | 12/2020 | Kaliteevskiy et al. | |
| 10,992,391 B1 | 4/2021 | Meyers et al. | |

(Continued)

FOREIGN PATENT DOCUMENTS

| CN | 103488022 B | 4/2016 |
|---|---|---|
| CN | 105680955 B | 9/2018 |

(Continued)

OTHER PUBLICATIONS

Virginia et al; A universal plug and play synchronization scheme for practical quantum networks; 2020; nature.com; pp. 1-6. (Year: 2020).*

(Continued)

*Primary Examiner* — Amritbir K Sandhu
(74) *Attorney, Agent, or Firm* — Fox Rothschild LLP; Robert J. Sacco; Carol Thorstad-Forsyth (57) ABSTRACT

Systems and methods for operating a quantum network system. The methods comprise, by a network node: generating optical clock pulses and photons using the optical clock pulses; generating a combined signal by combining the optical clock pulses with at least some of the photons such that a consistent temporal offset exits between the optical clock pulses and the first photons and/or a wave function of each photon at least partially overlaps an envelope of a respective one of the optical clock pulses; and transmitting the combined signal over a first quantum channel in which the optical clock pulses co-propagate with the photons.

22 Claims, 5 Drawing Sheets

(56) References Cited

U.S. PATENT DOCUMENTS

| | | | | |
|---|---|---|---|---|
| 11,329,730 | B2* | 5/2022 | Bucklew | G02F 1/3534 |
| 2014/0270802 | A1* | 9/2014 | Silverman | H04L 7/0075 |
| | | | | 398/155 |
| 2014/0355998 | A1* | 12/2014 | Tanzilli | H04L 7/0075 |
| | | | | 398/154 |
| 2016/0164615 | A1* | 6/2016 | Dailey | H04B 10/70 |
| | | | | 398/149 |
| 2017/0180111 | A1* | 6/2017 | Lanzone | H04L 7/0075 |
| 2020/0301244 | A1 | 9/2020 | Wang | |
| 2021/0105135 | A1* | 4/2021 | Figueroa | H04L 9/0858 |

FOREIGN PATENT DOCUMENTS

| | | |
|---|---|---|
| CN | 110870251 A | 3/2020 |
| EP | 2051411 | 4/2009 |
| GB | 2399220 | 7/2005 |
| WO | 2018232689 A1 | 12/2018 |
| WO | 2020197575 A1 | 10/2020 |

OTHER PUBLICATIONS

Giorgetta et al., "Optical two-way time and frequency transfer over free space," Nat. Photonics 7, 434 (2013).

D'Auria et al., "A universal, plug-and-play synchronisation scheme for practical quantum networks," npj Quantum Info. 6, 21 (2020).

Sun et al., "Entanglement swapping over 100 km optical fiber with independent entangled photon-pair sources," optica 4, 1214 (2017).

Sun et al., "Entanglement swapping with independent sources over an optical-fiber network," Phys. Rev. A 95, 032306 (2017).

Cao, Yuan & Li, Yu-Huai & Yang, Kui-Xing & Jiang, Yang-Fan & Li, Shuang-Lin & Hu, Xiao-Long & Abulizi, Maimaiti & Li, Cheng-Long & Zhang, Weijun & Sun, Qi-Chao & Liu, Wei-Yue & Jiang, Xiao & Shengkai, Liao & Wang, Jianyu & Li, Hao & You, Lixing & Wang, Zhen & Yin, Juan & Lu, Chao-Yang & Pan, Jian-Wei. (2020). Long-distance free-space measurement-device-independent quantum key distribution.

Samain, Etienne & Exertier, P. & Gourde, Clement & Fridelance, P & Guillemot, Philippe & Laas-Bourez, M & Torre, Jean-Marie. (2015). Time transfer by laser link: A complete analysis of the uncertainty budget. Metrologia. 52. 10.1088/0026-1394/52/2/423.

Valivarthi, Venkata Ramana Raju & Davis, Samantha & Pena, Cristian & Xie, Si & Lauk, Nikolai & Narvaez, Lautaro & Allmaras, Jason & Beyer, Andrew & Gim, Yewon & Hussein, Meraj & Iskander, George & Kim, Hyunseong & Korzh, Boris & Mueller, Andrew & Rominsky, Mandy & Shaw, Matthew & Tang, Dawn & Wollman, Emma & Simon, Christoph & Spiropulu, Maria. (2020). Teleportation Systems Towards a Quantum Internet.

Hua, Xin & Lunghi, Tommaso & Doutre, Florent & Vergyris, Panagiotis & Sauder, Gregory & Charlier, Pierrick & D'Auria, Virginia & Martin, Anthony & Tascu, Sorin & Micheli, Marc & Tanzilli, Sébastien & Alibart, Olivier. (2021). Configurable heralded two-photon Fock-states on a chip. AM1S.3.10.1364/CLEO_AT.2021.AM1S.3.

Tsujimoto, Yoshiaki & Wakui, Kentaro & Fujiwara, Mikio & Sasaki, Masahide & Takeoka, Masahiro. (2020). Ultra-fast Hong-Ou-Mandel interferometry via temporal filtering.

Calderaro, Luca & Stanco, Andrea & Agnesi, Costantino & Avesani, Marco & Dequal, Daniele & Villoresi, Paolo & Vallone, Giuseppe. (2020). Fast and Simple Qubit-Based Synchronization for Quantum Key Distribution. Physical Review Applied. 13. 10.1103/PhysRevApplied.13.054041.

Joseph Chapman—Towards Optical Quantum Communication in Space, Presentation at University of Chicago on Jan. 30, 2020; https://pme.uchicago.edu/event/joseph-chapman-towards-optical-quantum-communication-space.

Extended European Search Report dated Nov. 28, 2022 in corresponding European Patent Application No. 22176913.6 (10 pages).

* cited by examiner

SYSTEMS AND METHODS FOR SYNCHRONIZATION OF PHOTONS OVER QUANTUM CHANNELS WITH CO-PROPAGATING CLOCK PULSES

BACKGROUND

Statement of the Technical Field

The present document concerns quantum systems. More specifically, the present document concerns systems and methods for synchronization of photons over quantum channels with co-propagating clock pulses.

Description of the Related Art

Multi-photon operations are fundamental to all quantum communication protocols and networks involving distributed quantum resources. Distributed quantum resources are configured to facilitate distributed quantum entanglement in which pairs of quantum entangled photons or photons belonging to entangled states consisting of more than two photons are distributed between network nodes. Examples of multi-photon operations (where two or more photons are combined in an interactive operation) include a Bell State Measurement (BSM) using Hong-Ou-Mandel (HOM) interference, generalized operations of BSM to three or more photons, gating of quantum memory devices and detectors, and multi-qubit logic gates in the case of quantum processing.

BSM is typically used in entanglement swapping protocols as part of quantum repeater architectures to facilitate entanglement resources to be distributed over relatively long ranges (e.g., generally limited to 100 kilometers over fiber cables and 1000 kilometers over free space when distributing entangled pairs of photons because beyond that the loss rates are unmanageable). Other well-known uses of BSM include (i) Measurement-Device-Independent Quantum Key Distribution (MDI-QKD) and (ii) non-deterministic two-qubit gates for linear-optical quantum computing (e.g., KLM protocol). Various protocols for Quantum Key Distribution (QKD), quantum clock synchronization, and distributed processing in a sensor network, rely on distributing entanglement using entanglement swapping protocols which in turn rely on BSM. In cases where photon pairs are produced by pumping a non-linear crystal with high repetition rate pulsed lasers, multi-photon operations (such as BSM) are difficult to implement because the two photons need to arrive from separate network nodes within the photon coherence time (e.g., typically within one picosecond or less). Other methods exist that are capable of coherence times of up to microseconds, but such methods limit data rates (~1/coherence time). The fidelity of multi-photon operations and performance of the entanglement swapping protocols are dictated by the synchronization accuracy of the photon arrival times from separate sources.

Achieving sub-picosecond synchronization of photonic qubits from separate network nodes is an outstanding challenge. This is especially true for free-space links connecting ad hoc quantum networks involving mobile platforms because the photon travel distance to which the sub-picosecond synchronization corresponds is relatively small compared to the motions of the mobile platforms and because of the path delay fluctuations due to atmospheric effects.

Established clock synchronization protocols are not sufficient for picosecond or sub-picosecond accuracy. For instance, standard Global Positioning System (GPS) based protocols using Radio Frequency (RF) transmission provide a ten-nanosecond accuracy, which is ten thousand times worse than that required for multi-photon operations described above (i.e., those that require a picosecond or sub-picosecond accuracy of photon arrival times). Time transfer by laser link (T2L2) has recently been demonstrated for clock synchronization over free space. T2L2 provides a one hundred picosecond accuracy, which is one hundred times worse than that required for multi-photon operations described above.

Even if there is a solution with perfect clock synchronization, it still is not sufficient in the context of atmospheric effects and platform motion because those will negatively impact clock synchronization. Atmospheric effects can contribute uncertain path delay fluctuations of plus or minus ten picoseconds. Platform motion and thermal effects can contribute even more significant path delay fluctuations. So, even if there is perfect clock synchronization, active link monitoring and feedback loops would need to be employed to correct some of the issues caused by atmospheric effects and platform motion, but at the expense of increased complexity and higher link latency which impacts system performance.

U.S. Pat. No. 9,800,399 to Tanzilli et al. (Tanzilli) discloses a solution to clock synchronization for fiber-based quantum networks with fixed nodes such as that shown in FIG. 4 thereof. The solution is to have a centralized optical clock configured to transmit short optical pulses at a stable frequency and distribute the optical clock pulses in a parallel architecture to all entangled photon pair sources (e.g., represented as black stars in FIG. 4 of Tanzilli). When each optical clock pulse arrives at each of the entangled photon pair sources, the optical clock pulse is amplified and used to pump Spontaneous Parametric Down Conversion (SPDC) in a nonlinear crystal to produce entangled pairs of photons. From each of the synchronized sources of SPDC photons, one photon of each entangled pair will travel along the fiber in a direction towards a first end node (e.g., represented as node A in FIG. 4 of Tanzilli) and the other photon of each entangled pair will travel along the fiber in an opposite direction towards a second end node (e.g., represented as node B in FIG. 4 of Tanzilli). A quantum repeater node (e.g., represented as a white rectangle in FIG. 4 of Tanzilli) is provided between adjacent entangled photon pair sources. Ideally, photons from the adjacent entangled photon pair sources arrive at the quantum repeater node at the same time. The quantum repeater node then performs a BSM using the photons as part of an entanglement swapping protocol. So, in a fiber network with characterized link lengths, characterized link timings and a centralized optical clock, a picosecond or sub-picosecond timing accuracy can be realized at the quantum repeater nodes.

Tanzilli's solution is effective in fixed fiber network architectures because it relies on all optical components (i.e., does not perform conversion of optical pulses to electrical pulses causing jitter) and Commercial Off The Shelf (COTS) telecommunications equipment. However, Tanzilli's solution does not mitigate path delay fluctuations introduced by platform motion and atmospheric effects in ad hoc networks with free space quantum channels between mobile end nodes.

SUMMARY

This document concerns systems and methods for operating a quantum network system. The methods comprise: generating, by a first network node, a plurality of optical clock pulses and a plurality of photons using the optical clock pulses; generating, by the first network node, a combined signal by combining the plurality of optical clock pulses with at least first photons of the plurality of photons such that a consistent temporal offset exits between the optical clock pulses and the first photons; and transmitting, from the first network node, the combined signal over a first quantum channel in which the optical clock pulses co-propagate with the first photons. The quantum channel may include, but is not limited to, a free space atmospheric link, free space vacuum link, an optical fiber link or an underwater link.

In some scenarios, the photons may encode quantum information. The photons are generated using the clock pulses in a way such that they are both synchronized within a photon coherence time. The clock pulses and photons may be close enough in frequency and/or wavelength (spectrally similar) so that they will experience practically identical path delay fluctuations due to atmospheric effects. A wave function of each first photon may at least partially overlap an envelope of a respective one of the optical clock pulses.

Additionally or alternatively, the photons comprise entangled pairs of first signal photons and second signal photons. The first photons comprise the first signal photons, which are combined with the optical clock pulses to generate the combined signal, which is transmitted to a second network node over a first quantum channel. The second signal photons may similarly be transmitted, possibly in combination with the optical clock pulses, from the first network node to an adjacent network node over a second quantum channel (e.g., an optical fiber link).

The combined signal may be received by a second network node. At the second network node, the optical clock pulses and the first photons are separated by frequency, polarization, or other photonic degrees of freedom. Arrival times of the optical clock pulses and the first photons at the second network node may be within a picosecond of each other. The second network node may perform a multi-photon operation using a received first photon and a second photon which is locally generated at the second network node (where the received first photon comprises one of the first photons contained in the combined signal). The multi-photon operation may include, but is not limited to, BSM or a read/write operation in a quantum memory device.

In those or other scenarios, the methods also comprise generating pump pulses by changing a frequency of the optical clock pulses from a first frequency to a second different frequency. The pump pulses are used to generate the photons (e.g., in processes such as SPDC and/or Spontaneous Four-Wave Mixing (SWFM)).

The implementing system can comprise a processor and a non-transitory computer-readable storage medium comprising programming instructions that are configured to cause the processor to implement a method for operating a quantum system. Alternatively or additionally, the implementing system may include logic circuits (e.g., subtractors, combiners, etc.), passive circuit components (e.g., resistors, capacitors, switches, delays, etc.) and/or other active circuit components (e.g., transistors, optical clock generators, optical signal processors, optical frequency modifiers, path length adjusters, beamsplitters, couplers, nonlinear optical media, fiber-optic components, free-space optical components, photon generators, laser emitters, receivers, single-photon detectors, quantum memories, etc.).

BRIEF DESCRIPTION OF THE DRAWINGS

This disclosure is facilitated by reference to the following drawing figures, in which like numerals represent like items throughout the figures.

DETAILED DESCRIPTION

It will be readily understood that the solution described herein and illustrated in the appended figures could involve a wide variety of different configurations. Thus, the following more detailed description, as represented in the figures, is not intended to limit the scope of the present disclosure but is merely representative of certain implementations in different scenarios. While the various aspects are presented in the drawings, the drawings are not necessarily drawn to scale unless specifically indicated.

Reference throughout this specification to features, advantages, or similar language does not imply that all the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

The term "photons" as used herein refers to photons encoding quantum information, in any degree of freedom (e.g., polarization, frequency, etc.), discrete (qubit/qudit) or continuous-variable.

The present solution provides systems and methods for mitigating path delay fluctuations, including those introduced by platform motion, atmospheric effects in networks with free space quantum channels between mobile end nodes, optical clock pulse timing jitter and/or thermal effects. In this regard, the present solution distributes optical clock pulses in series and co-propagation with photons over quantum channels (e.g., free space atmospheric links) at similar but separable parameters (e.g., frequencies, wavelengths, polarizations, and/or orbital angular momentum). By transmitting the optical clock pulses in co-propagation with the photons (which in turn are pumped by frequency doubling the optical clock pulses) over the quantum channel (e.g., free space atmospheric link), the same timing path delay fluctuations are experienced by the optical clock pulses and the photons. This allows for picosecond or sub-picosecond timing synchronization and the cancelation of any path delay fluctuations, such as those due to platform motion and/or atmospheric effects.

At the receiver station, the optical clock pulses and photons arrive at the same time. The optical clock pulses and photons are then separated from each other by frequency or other degree of freedom. The optical clock pulses may be optically amplified, and frequency doubled (e.g., via Second Harmonic Generation (SHG) in a nonlinear crystal) to convert the received clock pulses into pump pulses. The pump pulses may be used to pump a local source of photon pairs at the receiver end.

Because the received photons experienced the same path delays as the optical clock pulses used to generate the local photons, the received and local photons are synchronized to the sub-picosecond accuracy required in a multi-photon operation. Stated differently, the locally produced photons are synchronized with sub-picosecond accuracy with the received photons since the locally generated photon pairs are synchronized with sub-picosecond accuracy with the received clock pulses and the received clock pulses are synchronized with sub-picosecond accuracy to the received photons. Therefore, one of the locally generated photons can be combined with the received photon in a multi-photon operation (e.g., BSM which relies on HOM interference). The remaining locally generated photon may be transmitted to a next node in the network (e.g., a next quantum repeater node for continuing the process of entanglement distribution).

The present solution obviates the need for combining experimental (low-to-mid-TRL) sub-picosecond clock synchronization protocols (such as optical frequency comb exchange) with active monitoring of the link's path delay fluctuations in complex feedback control systems in order to facilitate a continuous adjustment of transmit times and path delays from the transmitter and path delays applied in the receiver. In the present solution, path delays are automatically and systematically eliminated due to the fact that any path delay that applies to the photons trying to be synchronized also applies to the clock signal being used to synchronize those photons. The present solution can be realized using COTS telecommunications equipment.

Figure 1:
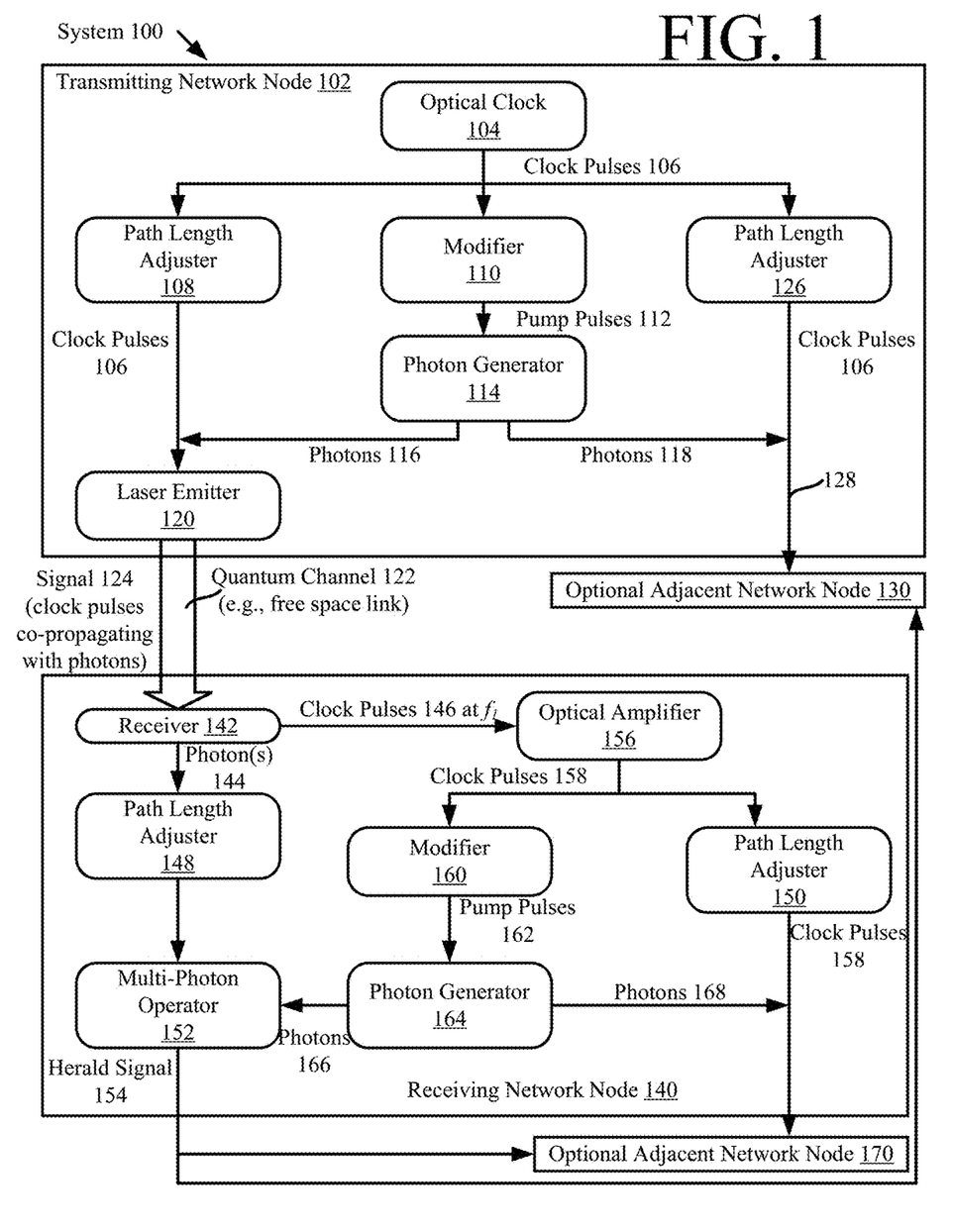
FIG. 1 provides an illustration of a system.

Referring now to FIG. 1, there is provided an illustration of a system 100 implementing the present solution. System 100 comprises a plurality of network nodes 102, 130, 140, 170. Network nodes 102, 140 can include, but are not limited to, mobile communication devices (e.g., smart phones, radios and/or other devices implementing optical communication technology). Network nodes 130, 170 can include, but are not limited to, quantum repeater node(s), end user node(s) and/or other devices implementing optical communication technology. Network nodes 130, 170 are optional nodes, and thus system 100 can be absent of the same in some scenarios.

Network node 102 is configured to generate and transmit photons to network nodes 140 and/or 130. The photons are transmitted between network nodes 102, 140 over a quantum channel 122. Quantum channel 122 can include, but is not limited to, a free space link, an optical fiber link, and/or an underwater link. Thus, network node 102 is also referred to herein as the transmitting network node. Network node 130 is referred to herein as an adjacent network node since it is located adjacent to the transmitting network node 102 in an optical fiber network. Network nodes 130, 170 may be the same as or similar to network node 140.

Network node 140 may also be configured to generate and communicate photons to network node 130 and network node 170. Network node 170 is referred to herein as an adjacent network node since it is located adjacent to network node 140 in the optical fiber network.

As shown in FIG. 1, the transmitting network node 102 comprises an optical clock 104, path length adjusters 108, 126, a frequency modifier 110, a photon generator 114, and a laser emitter 120. The laser emitter 120 may include a fiber coupler for a fiber link or a transmitting telescope for a free-space link. Optical clocks are well known. Optical clock 104 is generally configured to generate optical pulses 106 (e.g., laser pulses) at a first frequency $f_1$ and/or first wavelength $\lambda_1$ (e.g., 1540 nm). The optical pulses can have a width of a picosecond or other duration.

The optical pulses 106 are provided to the modifier 110. The modifier 110 performs operations to change (e.g., double) the frequency or wavelength of the optical pulses from the first frequency $f_1$ and/or wavelength $\lambda_1$ to a second frequency $f_2$ and/or wavelength $\lambda_2$ (e.g., 770 nm). The modifier 110 can include, but is not limited to, an SHG device which generates a wave with twice the optical frequency of the wave input into a nonlinear SHG medium (e.g., crystal or waveguide). SHG devices are well known. The wave output from the modifier 110 comprises pump pulses 112 at frequency $f_2$.

The pump pulses 112 are used by the photon generator 114 to generate photons. The photon generator 114 can include, but is not limited to, a photon generator that generates a single photon and/or an entangled photon generator that generates two or more entangled photons. In some scenarios, the entangled photon generator implements SPDC for converting photons of a higher energy into entangled pairs of photons with a lower energy. SPDC is a well-known technique in which spontaneous parametric down conversion is achieved via a nonlinear medium (e.g., crystal or waveguide). The nonlinear SPDC medium is designed and phase-matched to optimize nondegenerate pair-production. Nondegenerate pair-production includes a process in which entangled photon pairs are generated such that a first signal photon of each pair is at a third frequency $f_3$ and/or wavelength $\lambda_3$ (e.g., 1536 nm) and a second signal photon of each pair is at a fourth frequency $f_4$ and/or wavelength $\lambda_4$ (e.g., 1544 nm). The first and second photons are similar but distinguishable so that the photons can be separated using standard techniques (e.g., wavelength division multiplexing techniques) at the transmitting network node 140. The first photons 116 of the entangled pairs are provided to the network node 140 via laser emitter 120 and quantum channel 122. The second photons 118 of the entangled pairs are provided to the adjacent network node 130 via a separate quantum channel 128 (e.g., an optical fiber link).

Figure 2:
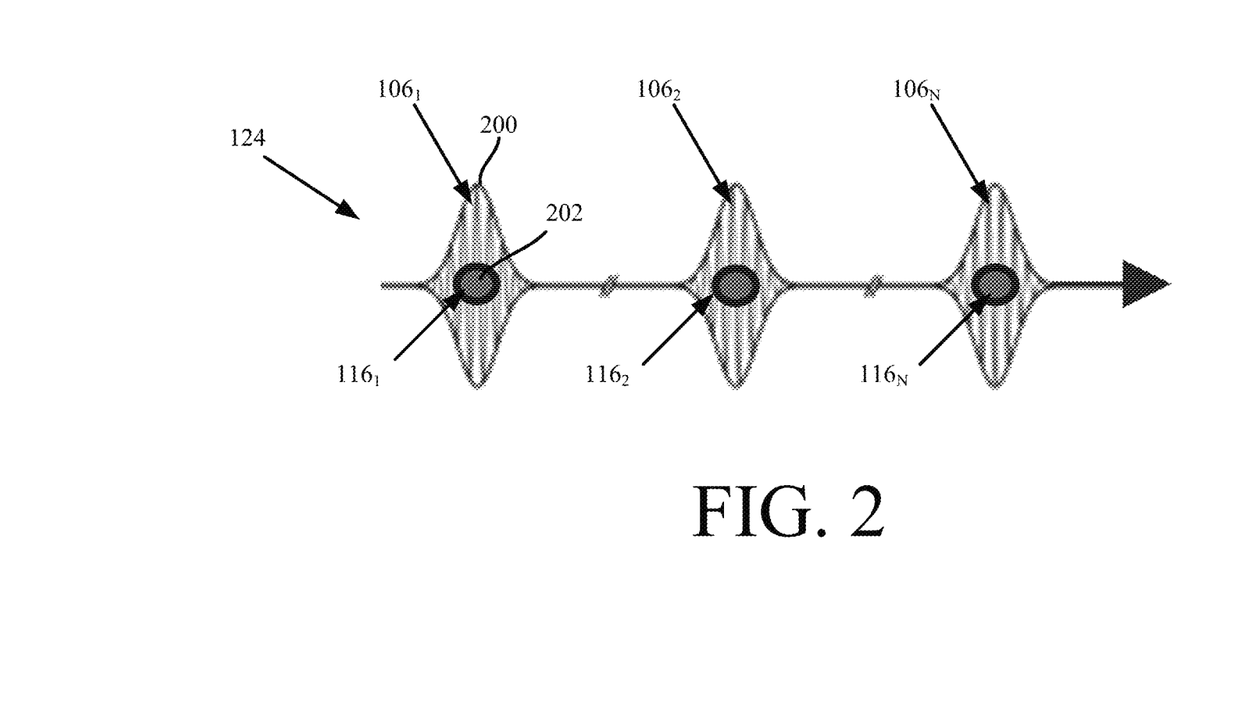
FIG. 2 provides an illustration of a combined signal comprising optical clock pulses co-propagating with photons.

At laser emitter 120, the clock pulses 106 are combined with the signal photons 116 to generate a combined signal 124. FIG. 2 shows an illustrative combined signal 124. The present solution is not limited to the illustrative signal architecture shown in FIG. 2. As shown in FIG. 2, the clock pulses $106_1, 106_2, \ldots, 106_N$ are combined with signal photons $116_1, 116_2, \ldots, 116_N$ such that they are synchronized with each other. For example, if the clock pulses are one picosecond wide, then each signal photon at least partially resides within the one picosecond (for example) width of a respective clock pulse. In this way, the clock pulse peak 200 and the central expectation value 202 of the photon time are within one picosecond of each other. Stated differently, the wave function of each photon at least partially overlaps an envelope of a respective clock pulse when the same are synchronized with each other. In some scenarios, the degree of this overlap may be between 20% to 100% overlap to obtain reasonable entangled state fidelities, data rates, and/or success rates in subsequent multi-photon operations. The present solution is not limited to scenarios where the wave function of each photon at least partially overlaps an envelope of a respective clock pulse. All that is needed is a consistent temporal offset between the photons and clock pulses.

Path length adjuster 108 may perform operations to actively or passively adjust a path length or delay for ensuring that the clock pulses 106 and signal photons 116 have a consistent temporal offset and/or overlap each other by a constant amount within combined signal 124. The path length/delay adjustments may or may not be necessary depending on the required level of synchronization and/or the magnitude of any differences in delay fluctuations between a left path 104/108/120 and a central path 104/110/114/120 (e.g., due to thermal fluctuations or mechanical vibrations in optical fiber). Techniques for adjusting path lengths/delays are well known. The path length/delay adjustments can be performed to ensure that the clock pulses and photons are synchronized with each other within combined signal 124. Path length adjuster 126 can be the same as or similar to path length adjuster 108.

The combined signal 124 is transmitted from laser emitter 120 over quantum channel 122, whereby the optical clock pulses and the signal photons are concurrently transmitted and co-propagate across the quantum channel. In some scenarios, the quantum channel 122 comprises a free space link in which path delay fluctuations may be caused by atmospheric effects and/or motions of nodes 102, 140.

When network node 140 receives the combined signal 124, its receiver 142 performs operations to separate the optical clock pulses and the signal photons. This separation can be achieved spectrally (via wavelength division multiplexing) or using other degrees of freedom (e.g., polarization and/or orbital angular momentum). Wavelength division multiplexing, polarization-based separation, and/or orbital angular momentum based separation are well known. The received signal photons 144 are then provided to a multi-photon operator 152 via a path length adjuster 148 at the third frequency $f_3$ or wavelength $\lambda_3$ (e.g., 1536 nm). Path length adjuster 148 is provided for ensuring that paths 142/148/152 and 142/156/160/164/152 are equal. As with path length adjuster 108, active path length adjustment may or may not be required depending on the level of fluctuations due to, for example, thermal fluctuations or mechanical vibrations in optical fiber. Thus, path length adjuster 148 can be the same as or similar to path length adjusters 108, 126 of the transmitting network node 102.

The multi-photon operator 152 is configured to perform multi-photon operations. The multi-photon operations can include, but are not limited to, BSM operations and/or read/write operations in quantum memory devices. BSM operations and read/write operations are well known. In the BSM scenarios, each iteration of the BSM operation uses synchronized photon pairs (comprising a received photon 144 and a locally generated photon 166), and when successful, generates a herald signal 154, which is communicated to adjacent network nodes 130, 170. By virtue of the locally generated signal photons 166 being synchronized with the received clock pulses 146, the locally generated signal photon 166 is synchronized with the received signal photon 144. This synchronization allows the sub-picosecond synchronization to be achieved at the multi-photon operator 152, i.e., the photons arrive at a beam splitter well within each other's coherent lengths. The herald signal 154 can indicate whether the entanglement swapping protocol operation of the network node 140 was successful and that the photons received at adjacent nodes 130, 170 are entangled with each other.

The locally generated signal photon 166 is produced in a central processing branch comprising components 156/160/164. The optical clock pulses 146 are provided from the receiver 142 to the optical amplifier 156 of the central processing branch at the first frequency $f_1$ and/or wavelength $\lambda_1$. Optical amplifier 156 is generally configured to amplify the optical clock pulses to produce amplified clock pulses 158. The optical amplifier can include, but is not limited to, an Erbium Doped Fiber Amplifier (EDFA) which is well known for telecommunication applications. The amplified clock pulses 158 are provided to the modifier 160 at the first frequency $f_1$ and/or wavelength $\lambda_1$. The modifier 160 is the same as or similar to modifier 110 of the transmitting network node 102. The modifier 160 can implement SHG technology for changing (e.g., doubling) the frequency of the amplified clock pulses from the frequency $f_1$ and/or wavelength $\lambda_1$ to frequency $f_2$ and/or wavelength $\lambda_2$. The wave output from the modifier 160 comprises pump pulses 162.

The pump pulses 162 are used by the photon generator 164 to generate photon qubits. The photon generator 164 can include, but is not limited to, an entangled photon generator that implements, for example, SPDC for converting photons of a higher energy into entangled pairs of photons with a lower energy. SPDC is a well-known technique in which spontaneous parametric down conversion is achieved via a nonlinear medium (e.g., crystal or waveguide). The nonlinear SPDC medium is designed and phase-matched to optimize nondegenerate pair-production. Nondegenerate pair-production includes a process in which entangled photon pairs are generated such that a first signal photon of each pair is at a third frequency $f_3$ or wavelength $\lambda_3$ (e.g., 1536 nm) and a second photon of each pair is at a fourth frequency $f_4$ or wavelength $\lambda_4$ (e.g., 1544 nm). The first and second photons are spectrally similar but distinguishable so that the photons can be separated using standard techniques (e.g., wavelength division multiplexing techniques). The first photons 166 of the entangled pairs are provided to the multi-photon operator 152. The second photons 168 of the entangled pairs are provided to adjacent network node 170.

A path length adjuster 150 can be provided to ensure that the clock pulses 158 and the photons 168 have a consistent temporal offset and/or overlap each other by a given constant amount when co-transmitted to adjacent network node 170. The path length adjuster 150 can be the same as or similar to path length adjusters 108, 126, 148.

Figure 3:
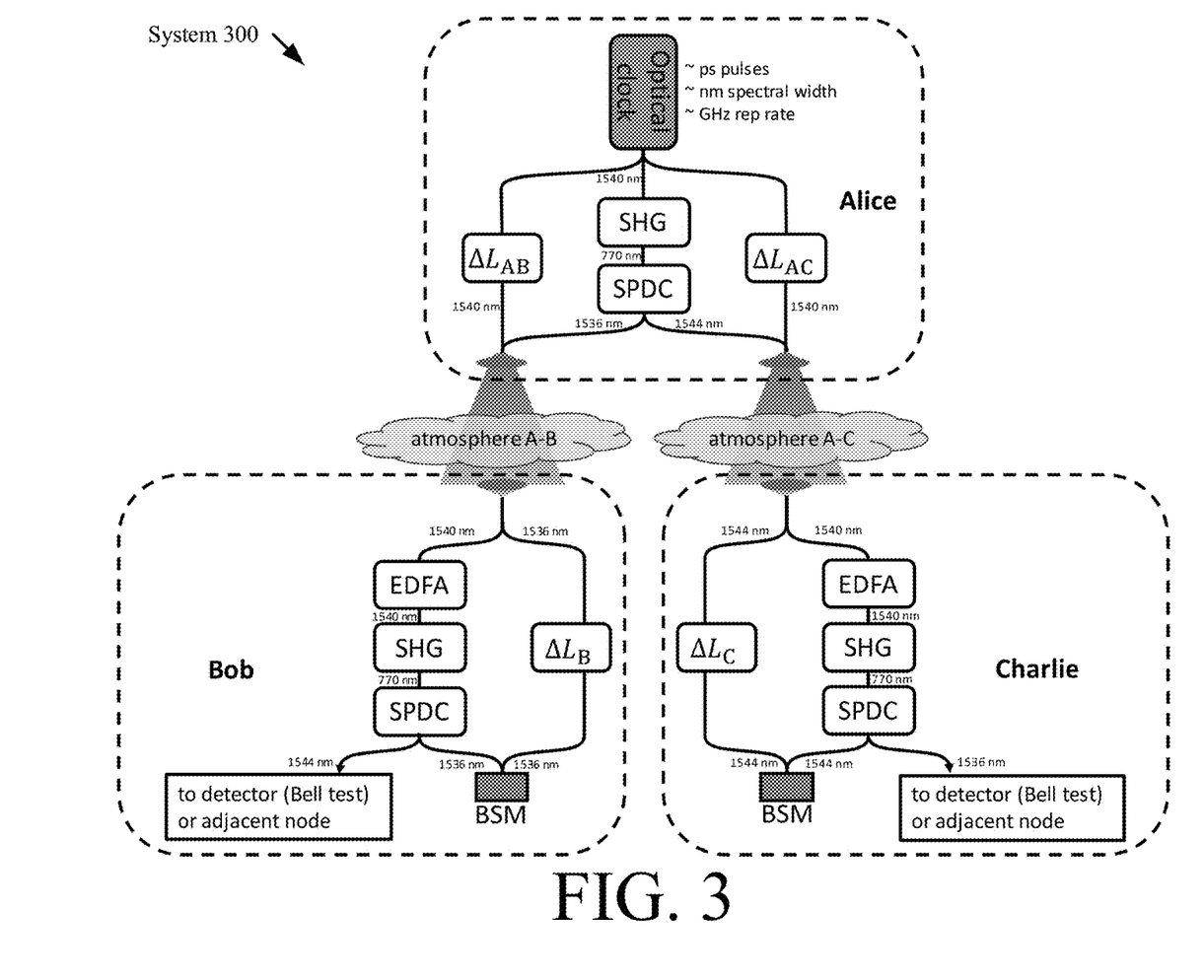
FIG. 3 provides an illustration of another system.

An illustrative system 300 is shown in FIG. 3 for a near-term proof-of-principle experimental demonstration. In system 300, the transmitting network node Alice is provided in a mobile platform (e.g., a space platform, an airborne platform, a terrestrial platform, or a marine platform). Alice performs operations to generate SPDC photon pairs. A first SPDC photon of the pair is transmitted with co-propagating clock pulses from Alice to a station Bob, and a second SPDC photon of the pair is transmitted with co-propagating clock pulses from Alice to a station Charlie. Bob and Charlie are each equipped with a BSM operator configured to perform an entanglement swapping protocol. In this way, entanglements are swapped so that the remaining photon is passed to either a detector to verify that the remaining photon is entangled (e.g., as part of a Bell test) or an adjacent node (e.g., an end user node or repeater node to perform yet another BSM to continue daisy-chaining of the entanglement down the line).

Figure 4:
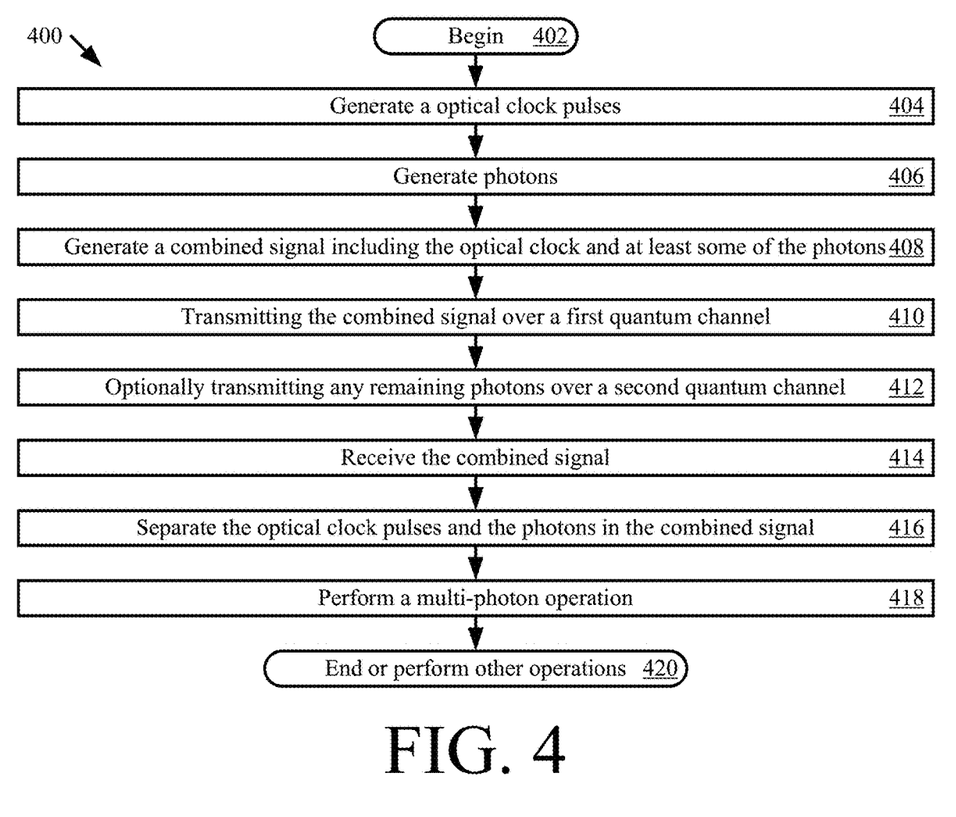
FIG. 4 provides a flow diagram of an illustrative method for operating network node(s) in a quantum system.

Referring now to FIG. 4, there is provided a flow diagram of an illustrative method for operating network node(s) of a quantum system (e.g., system 100 of FIG. 1, or 300 of FIG. 3). Method 400 begins with 402 and continues with 404 where a first network node (e.g., network node 102 of FIG. 1, or Alice of FIG. 3) performs operations to generate optical clock pulses (e.g., optical clock pulses 106 of FIG. 1 and/or $106_1, \ldots, 106_N$ of FIG. 2). Techniques for generating optical clock pulses are well known. Next in 406, the first network node generates photons using the optical clock pulses. In this regard, a frequency of the optical clock pulses may be changed from a first frequency (e.g., frequency $f_1$ of FIG. 1) and/or wavelength $\lambda_1$ (e.g., 1540 nm in FIG. 3) to a second different frequency (e.g., frequency $f_2$ of FIG. 1) and/or wavelength $\lambda_2$ (e.g., 770 nm in FIG. 3) to produce pump pulses (e.g., pump pulses 112 of FIG. 1). The pump pulses are used to generate the photons. In some scenarios, the photons comprise entangled pairs of first photons (e.g., photons 116 of FIG. 1) and second photons (e.g., photons 118 of FIG. 1). Techniques for generating entangled pairs of photons are well known.

In 408, the first network node generates a combined signal (e.g., signal 124 of FIG. 1) comprising the optical clock pulses and at least some of the photons (e.g., the photons 116 of FIG. 1). The optical clock pulses are combined with the photons such that they have a consistent temporal offset and/or overlap each other by a given constant amount. The combined signal is transmitted from the first network node over a first quantum channel (e.g., quantum channel 122 of FIG. 1) in 410. The optical clock pulses co-propagate with the photons during transmission. The quantum channel may include, but is not limited to, a free space link, an optical fiber link or an underwater link. Any remaining photons (e.g., photons 118 of FIG. 1) may be transmitted from the first network node to an adjacent network node (e.g., network node 130 of FIG. 1), with co-propagating optical clock pulses, over a second quantum channel (e.g., quantum channel 128 of FIG. 1), as shown by 412.

In 414, the combined signal is received by a second network node (e.g., network node 140 of FIG. 1). At the second network node, the optical clock pulses and the photons are separated (e.g., by frequency, polarization, or other photonic degree of freedom) as shown by 416. Arrival times of the optical clock pulses and photons at the second network node may be within a picosecond of each other. The second network node may perform a multi-photon operation in 418 using a received photon (e.g., photon 144 of FIG. 1) and another photon (e.g., photon 166 of FIG. 1) which is locally generated at the second network node. The multi-photon operation may include, but is not limited to, BSM. Subsequently, 420 is performed where method 400 ends or other operations are performed (e.g., return to 402, communicate a herald signal 154 to an adjacent network node 170 of FIG. 1, and/or locally generated photons 168 with co-propagating clock pulses 158 to adjacent network nodes 130 and/or 170 of FIG. 1).

Figure 5:
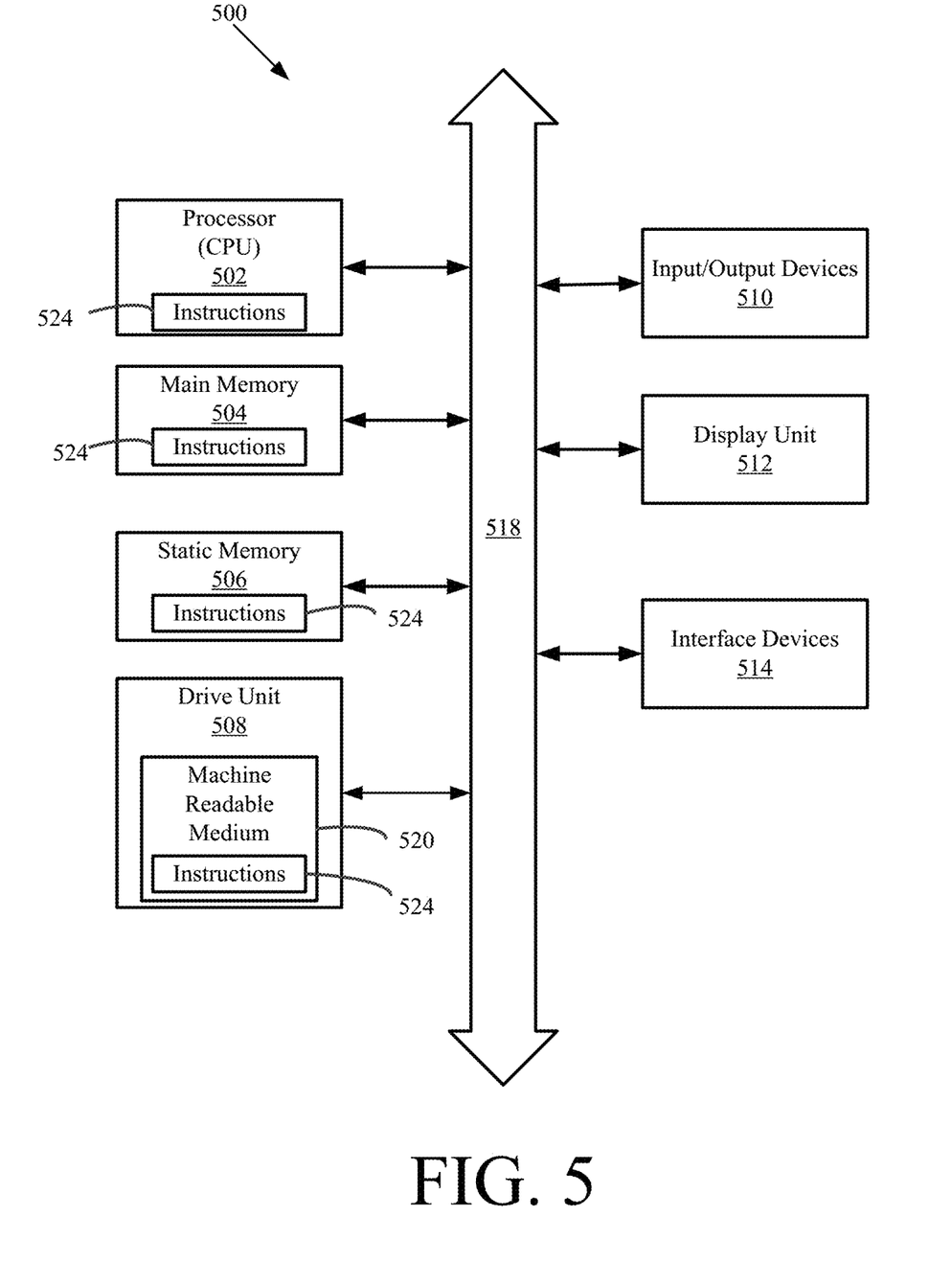
FIG. 5 provides a hardware block diagram comprising an illustrative computer system.

Referring now to FIG. 5, there is shown a hardware block diagram comprising an illustrative computer system 500 that can be used for implementing all or part of network nodes 102, 130, 140, 170 of FIG. 1 and/or network nodes Alice, Bob, Charlie of FIG. 3. The machine can include a set of instructions which are used to cause the circuit/computer system to perform any one or more of the methodologies discussed herein. While only a single machine is illustrated in FIG. 5, it should be understood that in other scenarios the system can be taken to involve any collection of machines that individually or jointly execute one or more sets of instructions as described herein.

The computer system 500 is comprised of a processor 502 (e.g., a Central Processing Unit (CPU)), a main memory 504, a static memory 506, a drive unit 508 for mass data storage and comprised of machine readable media 520, input/output devices 510, a display unit 512 (e.g., a Liquid Crystal Display (LCD)) or a solid state display, and one or more interface devices 514. Communications among these various components can be facilitated by means of a data bus 518. One or more sets of instructions 524 can be stored completely or partially in one or more of the main memories 504, static memory 506, and drive unit 508. The instructions can also reside within the processor 502 during execution thereof by the computer system. The input/output devices 510 can include a keyboard, a multi-touch surface (e.g., a touchscreen) and so on. The interface device(s) 514 can be comprised of hardware components and software or firmware to facilitate an interface to external circuitry. For example, in some scenarios, the interface devices 514 can include one or more Analog-to-Digital (A/D) converters, Digital-to-Analog (D/A) converters, input voltage buffers, output voltage buffers, voltage drivers and/or comparators. These components are wired to allow the computer system to interpret signal inputs received from external circuitry and generate the necessary control signals for certain operations described herein.

The drive unit 508 can comprise a machine readable medium 520 on which is stored one or more sets of instructions 524 (e.g. software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include solid-state memories, Electrically Erasable Programmable Read-Only Memory (EEPROM) and flash memory devices. A tangible medium as described herein is one that is non-transitory insofar as it does not involve a propagating signal.

Computer system 500 should be understood to be one possible example of a computer system which can be used in connection with the various implementations disclosed herein. However, the systems and methods disclosed herein are not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems broadly include a variety of electronic and computer systems. Thus, the exemplary system is applicable to software, firmware, and hardware implementations.

Further, it should be understood that embodiments can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A method for operating a quantum network system, comprising:
    generating, by a first network node, a plurality of optical clock pulses and a plurality of photons using the optical clock pulses;
    generating, by the first network node, a combined signal by combining the plurality of optical clock pulses with at least first photons of the plurality of photons such that a consistent temporal offset exits between the optical clock pulses and the first photons; and
    transmitting, from the first network node, the combined signal over a first quantum channel in which the optical clock pulses co-propagate with the first photons;
    wherein the plurality of optical clock pulses is combined with the first photons such that a wave function of each said first photon at least partially overlaps an envelope of a respective one of said optical clock pulses.

2. The method according to claim 1, wherein the plurality of photons and the plurality of clock pulses are synchronized within a photon coherence time.

3. The method according to claim 1, wherein the quantum channel comprises a free space link, an optical fiber link or an underwater link.

4. The method according to claim 1, wherein the plurality of photons comprises entangled pairs of first signal photons and second signal photons.

5. The method according to claim 4, wherein the first photons comprise the first signal photons.

6. The method according to claim 4, further comprising transmitting the second signal photons from the first network node to an adjacent network node over a second quantum channel.

7. The method according to claim 1, further comprising generating pump pulses by changing a frequency or wavelength of the plurality of optical clock pulses from a first frequency or wavelength to a second different frequency or wavelength, wherein the pump pulses are used to generate the plurality of photons.

8. The method according to claim 1, further comprising, by a second network node, receiving the combined signal and separating the optical clock pulses and the first photons contained in the combined signal by at least one photonic degree of freedom.

9. The method according to claim 8, wherein arrival times of the optical clock pulses and the first photons at the second network node are within a picosecond of each other.

10. A method for operating a quantum network system, comprising:
    generating, by a first network node, a plurality of optical clock pulses and a plurality of photons using the optical clock pulses;
    generating, by the first network node, a combined signal by combining the plurality of optical clock pulses with at least first photons of the plurality of photons such that a consistent temporal offset exits between the optical clock pulses and the first photons; and
    transmitting, from the first network node, the combined signal over a first quantum channel in which the optical clock pulses co-propagate with the first photons;
    comprising, by a second network node, receiving the combined signal and separating the optical clock pulses and the first photons contained in the combined signal by at least one photonic degree of freedom; and
    performing a multi-photon operation using a received first photon and a second photon which is locally generated at the second network node using clock pulses received from the first network node, the received first photon comprising one of the first photons contained in the combined signal.

11. The method according to claim 10, wherein the multi-photon operation comprises a Bell state measurement or a read/write operation in a quantum memory device.

12. A system, comprising:
    a processor;
    a non-transitory computer-readable storage medium comprising programming instructions that are configured to cause the processor to implement a method for operating a quantum network system, wherein the programming instructions comprise instructions to:
        generate a plurality of optical clock pulses and a plurality of photons using the optical clock pulses;
        generate a combined signal by combining the plurality of optical clock pulses with at least first photons of the plurality of photons such that a consistent temporal offset exits between the optical clock pulses and the first photons; and
        transmit the combined signal over a first quantum channel in which the optical clock pulses co-propagate with the photons;
    wherein the plurality of optical clock pulses is combined with the first photons such that a wave function of each said first photon at least partially overlaps an envelope of a respective one of said optical clock pulses.

13. The system according to claim 12, wherein the plurality of photons and the plurality of clock pulses are synchronized within a photon coherence time.

14. The system according to claim 12, wherein the quantum channel comprises a free space link, an optical fiber link or an underwater link.

15. The system according to claim 12, wherein the plurality of photons comprises entangled pairs of first signal photons and second signal photons.

16. The system according to claim 15, wherein the first photons comprise the first signal photons.

17. The system according to claim 15, wherein the programming instructions further comprise instruction to cause transmission of the second signal photons from a network node to another adjacent network node over a second quantum channel.

18. The system according to claim 12, wherein the programming instructions further comprise instructions to cause generation of pump pulses by changing a frequency or wavelength of the plurality of optical clock pulses from a first frequency or wavelength to a second different frequency or wavelength, wherein the pump pulses are used to generate the plurality of photons.

19. The system according to claim 12, wherein the programing instructions further comprise instructions to cause the combined signal to be received at a network node and cause the optical clock pulses and the first photons contained in the combined signal to be separated by at least one photonic degree of freedom.

20. The system according to claim 19, wherein arrival times of the optical clock pulses and the first photons at the network node are within a picosecond of each other.

21. A system, comprising:
a processor;
a non-transitory computer-readable storage medium comprising programming instructions that are configured to cause the processor to implement a method for operating a quantum network system, wherein the programming instructions comprise instructions to:
generate a plurality of optical clock pulses and a plurality of photons using the optical clock pulses;
generate a combined signal by combining the plurality of optical clock pulses with at least first photons of the plurality of photons such that a consistent temporal offset exits between the optical clock pulses and the first photons;
transmit the combined signal over a first quantum channel in which the optical clock pulses co-propagate with the photons;
cause the combined signal to be received at a network node and cause the optical clock pulses and the first photons contained in the combined signal to be separated by at least one photonic degree of freedom; and
perform a multi-photon operation using a received first photon and a second photon which is locally generated at the network node using clock pulses received from the first network node, the received first photon comprising one of the first photons contained in the combined signal.

22. The system according to claim 21, wherein the multi-photon operation comprises a Bell state measurement or a read/write operation in a quantum memory device.

* * * * *